(12) United States Patent
Tucker

(10) Patent No.: US 7,873,034 B2
(45) Date of Patent: Jan. 18, 2011

(54) SYSTEM AND METHOD FOR PROVIDING FEATURE MEDIATION AND ORCHESTRATION ON INTERNET PROTOCOL SERVICE NETWORKS

(75) Inventor: Douglas Tucker, San Mateo, CA (US)

(73) Assignee: Ubiquity Software Corporation Limited, Wales (GB)

( * ) Notice: Subject to any disclaimer, the term of this patent is extended or adjusted under 35 U.S.C. 154(b) by 1238 days.

(21) Appl. No.: 11/477,314

(22) Filed: Jun. 29, 2006

(65) Prior Publication Data

US 2008/0037747 A1  Feb. 14, 2008

(51) Int. Cl.
*H04L 12/66* (2006.01)

(52) U.S. Cl. .................. 370/356; 370/352; 370/401; 370/410; 379/88.14; 379/67.1; 379/201.03

(58) Field of Classification Search ............. 379/265.09, 379/265.02, 201.01, 88.17, 88.02; 370/252
See application file for complete search history.

(56) References Cited

U.S. PATENT DOCUMENTS

| | | | | |
|---|---|---|---|---|
| 4,817,127 | A * | 3/1989 | Chamberlin et al. ..... | 379/88.11 |
| 6,519,228 | B1 * | 2/2003 | Creamer et al. ........ | 379/15.01 |
| 6,850,600 | B1 * | 2/2005 | Boeckman et al. ........ | 379/45 |
| 6,885,736 | B2 * | 4/2005 | Uppaluru ............... | 379/88.17 |
| 7,221,945 | B2 * | 5/2007 | Milford et al. .......... | 455/452.1 |
| 7,769,364 | B2 * | 8/2010 | Logan et al. ............ | 455/413 |
| 2001/0005372 | A1 * | 6/2001 | Cave et al. ............. | 370/401 |
| 2001/0036176 | A1 * | 11/2001 | Girard ................. | 370/352 |
| 2002/0051519 | A1 * | 5/2002 | Moyano et al. .......... | 379/67.1 |
| 2002/0156900 | A1 * | 10/2002 | Marquette et al. ....... | 709/227 |
| 2003/0088421 | A1 * | 5/2003 | Maes et al. ............. | 704/270.1 |
| 2004/0093343 | A1 * | 5/2004 | Lucas et al. ............ | 707/102 |
| 2004/0230659 | A1 * | 11/2004 | Chase .................. | 709/206 |
| 2004/0246947 | A1 * | 12/2004 | Wong .................. | 370/352 |
| 2006/0171509 | A1 * | 8/2006 | Berthaud et al. ......... | 379/1.04 |
| 2006/0222166 | A1 * | 10/2006 | Ramakrishna et al. . | 379/265.09 |

OTHER PUBLICATIONS

HP® invent, 5981-XXXXEN, Dec. 2003, Network and Service Provider Solutions, "Ubiquity SIP Application Server A solution brief from HP," pp. 1-4.

* cited by examiner

*Primary Examiner*—Curtis Kuntz
*Assistant Examiner*—Phung-Hoang J Nguyen
(74) *Attorney, Agent, or Firm*—Chapin IP Law, LLC; David W. Rouille, Esq.

(57) ABSTRACT

Systems and methods for providing feature mediation and orchestration on SIP-enabled networks are shown. In one exemplary embodiment, a method may include providing a first telephony services application, providing a second telephony services application, and combining a feature of the first telephony services application with a feature of the second telephony services application to form a logical telephony services application. In another exemplary embodiment, a system may include an application server platform and a feature mediation layer operable upon the application server platform, where the feature mediation layer provides a subscriber with a feature of the first telephony services application and a feature of the second telephony services application.

15 Claims, 4 Drawing Sheets

SYSTEM AND METHOD FOR PROVIDING FEATURE MEDIATION AND ORCHESTRATION ON INTERNET PROTOCOL SERVICE NETWORKS

CROSS-REFERENCE TO RELATED APPLICATION

The present application is related to co-pending and commonly assigned U.S. patent application Ser. No. 11/288,026, entitled "Service Structured Application Development Architecture," filed Nov. 28, 2005, the disclosure of which is hereby incorporated herein by reference.

TECHNICAL FIELD

The invention relates generally to telephony services and, more particularly, to a system and method for providing feature mediation and orchestration on Internet protocol service networks, such as session initiated protocol (SIP)-enabled networks.

BACKGROUND OF THE INVENTION

Traditionally, telephony applications have been built within isolated, vertical platforms—i.e., self-contained boxes, each performing a fixed set of functions. Such applications have been specifically designed for each particular vendor, hence providing little opportunity for enhancements and addition of functions. Generally, custom modifications to traditional telephony applications required a substantial financial investment, as well as time to implement, test, and deploy. Therefore, technological and market developments could not be easily accommodated.

More recently, however, service providers have recognized that differentiated services drive markets more so than price competition models. Accordingly, they have offered groups of services, sometimes closely bundled, in order to attract new subscribers. Unfortunately, as mentioned above, traditional telephony applications do not typically provide custom functions, and do not lend themselves to integration. Attempts have been made in the past to provide open application environments that facilitate the development of new applications for providing custom services. However, such open application environments frequently require that service providers write their custom applications entirely. This has proven to require more investment than the service provider could justify.

BRIEF SUMMARY OF THE INVENTION

The present invention comprises systems and methods for providing feature mediation and orchestration on Internet protocol service networks, such as SIP-enabled networks. In one embodiment, the present invention allows telecommunications service providers or carriers to take off-the-shelf, monolithic third-party applications, and host such applications through a platform that enables them to combine various of their functions, add functions, replace functions, etcetera to extend and/or enhance their operation. The present invention may also add completely new, custom applications to this environment, and mix them together seamlessly for a unified service delivery to the end customer. Embodiments may utilize a service compatibility interaction manager (SCIM), a service orchestration application (SOA), and/or combinations in providing feature mediation and orchestration with respect to the various applications.

Embodiments of the present invention may provide multi-level orchestration (e.g., three-level orchestration) of telecommunication services that enables a carrier to combine particular features of proprietary telephony services applications with custom designed applications into logical telephony services applications. For example, the present invention may allow a carrier to mix a particular feature or service of one telephony services application with another feature or service of a different telephony services application in order to create an entirely new application.

In one embodiment, the present invention may integrate different functions existing within a single application, functions from different applications, and even functions from different systems. The present invention allows a service provider to customize the operation of applications for groups of subscribers or for individual subscribers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
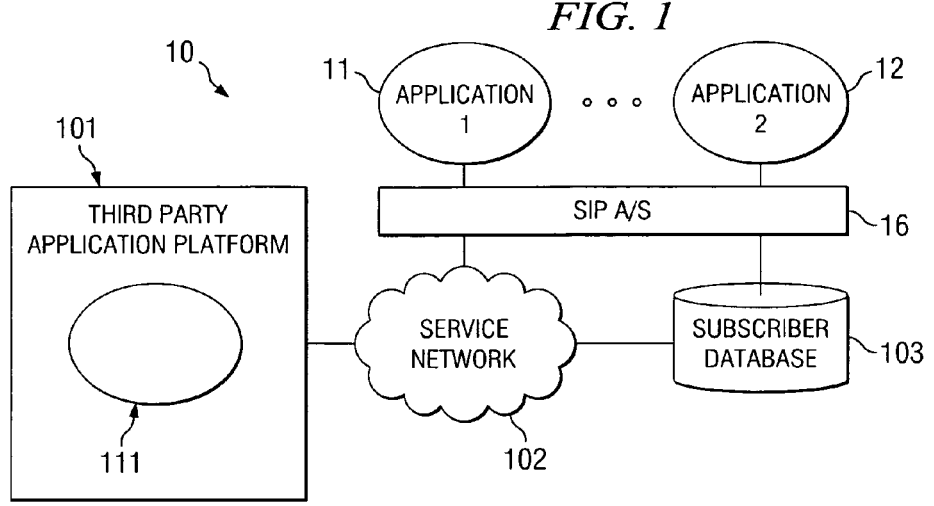
FIG. 1 shows a block diagram of an application installation on top of Internet protocol (IP) based service network infrastructure.

FIG. 1 shows service network (SN) application system 10, such as may comprise IP multimedia subsystem (IMS) infrastructure including SIP A/S platform 16 currently available from Ubiquity Systems, the assignee of the present invention. System 10 illustrates how applications 11, 12, and 111 may be deployed on top of IP based service network infrastructure, such as session initiation protocol application server (SIP A/S) platform 16. Internet protocol (IP) SN (IPSN) 102 of the illustrated embodiment provides entry points for subscribers to access applications of system 10. IPSN 102 may provide session control for subscribers accessing services, and may comprise one or more SIP servers. Subscribers are connected to IPSN 102 and authenticated in the illustrated embodiment using subscriber database 103, such as may comprise a home subscriber system (HSS), which preferably contains subscriber authentication information. After the subscriber is authenticated, subscriber database 103 may inform IPSN 102 about which applications or services to provide to the subscriber. Accordingly, IPSN 102 may either provide the subscriber with indirect access to an appropriate application, such as one of applications 11 and 12 though SIP A/S platform 16, or may directly connect the subscriber to an application, such as application 111 of third-party application platform 101 (eg., depending on the underlying service network authentication model implemented). Each of applications 11, 12, and 111 are typically separate, individual applications. In one embodiment, once the subscriber is attached to an application, the subscriber remains with that application until his or her session is terminated.

Application programs 11 and 12 are written on top of SIP A/S platform 16. Typically, application programs 11 and 12 may be written in the form of servlets. Accordingly, application programs 11 and 12 each may be compiled into a single servlet object and loaded onto SIP A/S platform 16 independently. Once an application program is loaded on SIP A/S platform 16, such application programs may have access to a series of application program interfaces (APIs), which are function calls across the boundary between each servlet and the host platform (but not between the servlets themselves) that allow the servlets to send SIP and non-SIP (RMI or SOAP) messages, receive SIP and non-SIP messages, change the content of SIP and non-SIP messages, and perform other application specific functions.

An example of a simple application, such as may correspond to either of application programs 11 or 12, provides a back-to-back user agent, where SIP elements outside of SIP A/S platform 16 (e.g., two SIP telephones) are placed in communication with one another and the application program provides desired functionality with respect to the communication. For example, application program 11 may operate to connect and log the call. Accordingly, when caller A places a call to caller B, the call is routed into SIP A/S platform 16. SIP A/S platform 16 determines that the call needs to access the back-to-back user application, in this example application program 11, and passes a notification to application program 11 through an API. The notification may provide information to application program 11 that the call is coming in as well as information that was contained in the SIP invite. Application program 11 may analyze the information, make a determination that a call is to be connected to caller B, pass a new invite to caller B in order to ring that caller's phone, and create a log of the call. Application program 12 may operate in a similar way to separately provide different functionality.

As noted above, the foregoing application programs are written offline, compiled into a SIP servlet, and loaded on top of SIP A/S platform 16. In common practice, application programs 11 and 12 are written in their entirety, compiled, and loaded onto SIP A/S platform 16. Such applications are typically independent and isolated with respect to one another, hence unable to interact in any meaningful way. Resources within a service network (such as, for example, media servers, audio mixers, transcoders, and the like) that are being used by these application programs may not be shared effectively among them. In other words, application programs of system 10 work generally as separate and autonomous application programs deployed on a common platform.

As a person of ordinary skill in the art will recognize in light of this disclosure, embodiments of the present invention provide multi-level (e.g., one, two, or three-level) orchestration of telecommunication services that enables a service provider to combine particular features of proprietary or custom written telephony services applications into one logical telephony services application without changing the applications directly. Additionally or alternatively, embodiments of the present invention allow a service provider to combine an external, stand-alone application, with custom written applications. Orchestration may be achieved, for example, through a coordinated scripting engine.

In one embodiment of the present invention, a first level of orchestration adopts a service oriented architecture of a top down orchestration capability. This service oriented architecture may be provided, for example, through a service oriented object framework (SOOF) infrastructure that a feature mediation function is built upon. The feature mediation function preferably combines service blocks of different applications to form a single application. A second level of orchestration may take multiple applications and inspect the protocol interactions between the external devices and those applications, thereby providing a way of scripting the sequencing of access to applications based on the types of information and the types of control that are requested across the boundary. A third-level of orchestration may build the primary applications and service functions through the first two levels of orchestration, and then define sets of service layers or levels that a subscriber can be assigned to. The service provider may assign levels of access to each subscriber, so that as each subscriber enters the service a filter criteria can be applied on a per subscriber basis.

Figure 2:
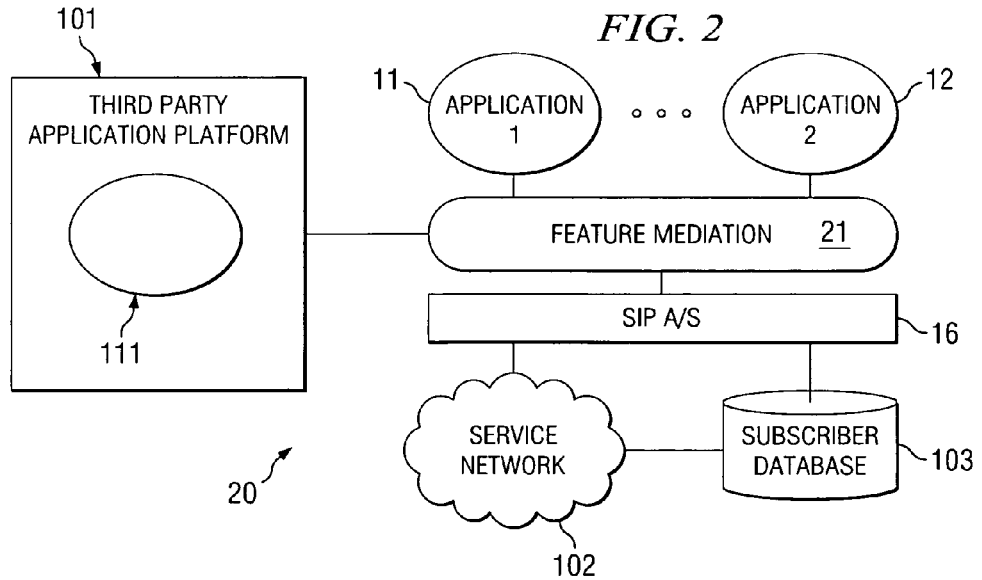
FIG. 2 shows a block diagram of a feature mediation system adapted for use with non-service orchestration application (SOA) applications according to an embodiment of the present invention.

FIG. 2 shows a block diagram of feature mediation and orchestration system 20, adapted to accommodate non-SOA applications according to an exemplary embodiment of the present invention. System 20 of the illustrated embodiment provides a first level of orchestration of individual applications by introducing feature mediation layer 21 on top of SIP A/S platform 16. In one embodiment, feature mediation layer 21 is an extension of SIP A/S platform 16. Feature mediation layer 21 preferably provides a connection point between application 11, application 12, and/or application 111 of third-party application platform 101, providing an orchestration point among these independent applications. More specifically, feature mediation layer 21 preferably provides switching between applications down to the independent feature level or operation level of an individual session. In operation, when a subscriber is authenticated through subscriber database 103, it may be switched by IPSN 102 to a logical telephony services application that may be made up of a combination of features of application 11, application 12, and/or application 111 of third-party application platform 101. In one embodiment, the subscriber session is effectively terminated, marked within the feature mediation layer 21, and then selectively handed over to the applications under control of a script that the service provider may modify.

It should be appreciated that, although third-party application platform 101 is shown coupled directly to feature mediation layer 21, third-party application platform 101 may be indirectly coupled thereto. For example, third-party application platform 101 may be disposed remotely with respect to any or all of feature mediation layer 21, application 11, application 12, SIP A/S platform 16, and subscriber database 103. Accordingly, feature mediation layer 21 may be coupled to third-party application platform 101 via a network connection, such as may comprise a local area network (LAN), a metropolitan area network (MAN), a wide area network (WAN), IPSN 102, the Internet, a wireless network, etcetera. Similarly, any of feature mediation layer 21, application 11, application 12, SIP A/S platform 16, and subscriber database 103 may be disposed remotely with respect to any of the remaining components of system 20 and thus may be coupled thereto via a network connection, such as those mentioned above.

In operation according to an exemplary embodiment, feature mediation layer 21 appears to IPSN 102 as a platform hosting one or more applications, similar to the configuration of SIP A/S platform 16. However, the applications hosted by feature mediation layer 21 of the illustrated embodiment include one or more logical applications formed from features combined from a plurality of other applications through operation of feature mediation layer 21. Accordingly, the subscriber session as initiated from service network 102 may be terminated within feature mediation layer 21, with logic of feature mediation layer 21 operating to mediate and/or orchestrate interaction with appropriate ones of applications 11, 12, and 111 to invoke desired features thereof. For example, scripts of feature mediation layer 21 (e.g., command sequences and parameters operable to navigate, operate, and/or control an application in a predetermined way) may be utilized to interact with a particular application of applications 11, 12, and 111 and invoke a desired feature at a particular time, preferably passing appropriate information thereto and/or receiving information therefrom. By invoking such features in a controlled fashion, whether serially and/or in parallel, feature mediation layer 21 operates to combine these features into a logical application, such as may provide a desired service to subscribers of service network 102.

Figure 3:
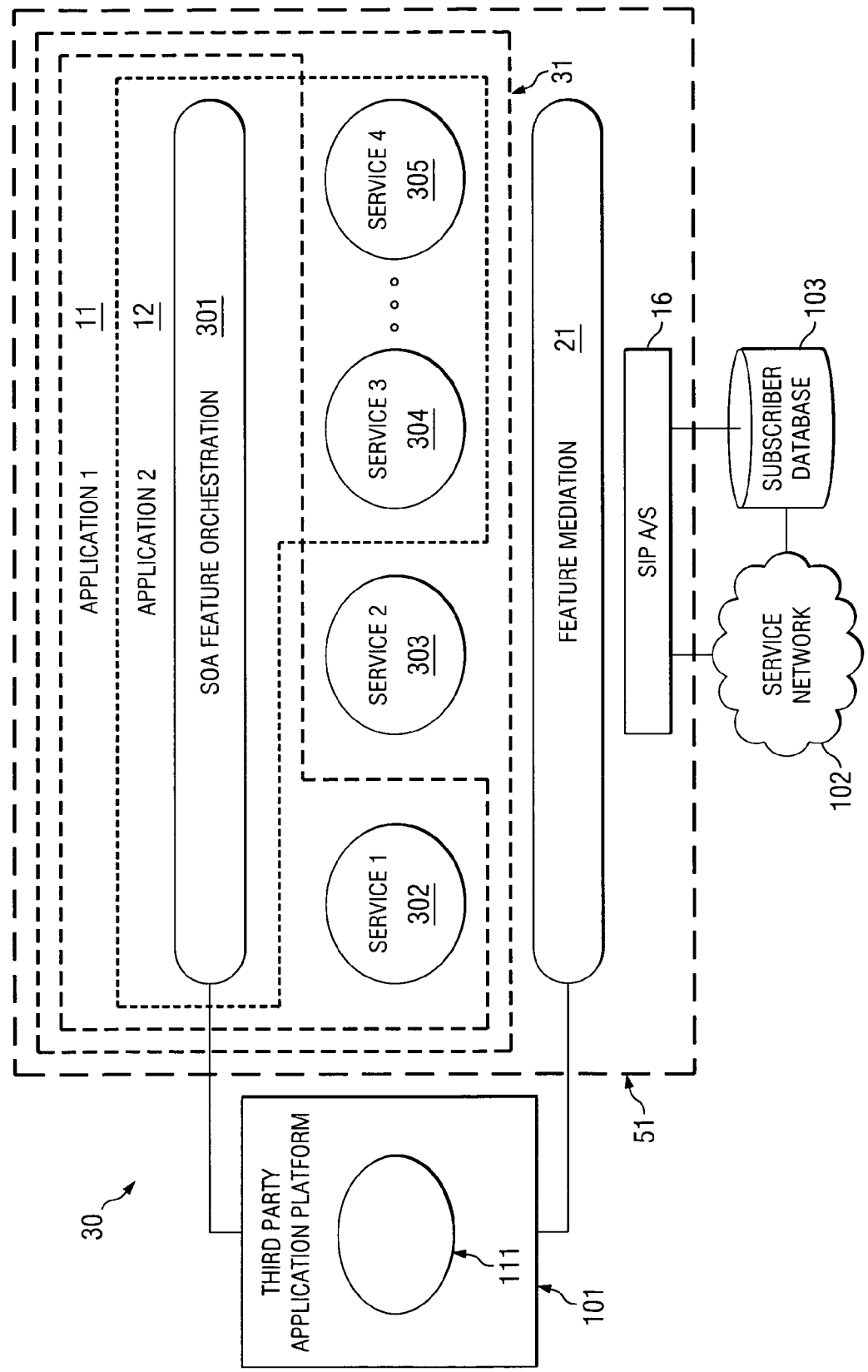
FIG. 3 shows a block diagram of a feature mediation and orchestration system adapted for use with SOA applications according to an embodiment of the present invention.

FIG. 3 shows a block diagram of feature mediation and orchestration system 30, adapted to accommodate SOA applications according to an embodiment of the present invention. In addition to feature mediation layer 21 discussed above, system 30 of the illustrated embodiment provides a second level of orchestration by introducing service orchestration application (SOA) layer 301 on top of SIP A/S platform 16.

It should be appreciated that, although third-party application platform 101 is shown coupled directly to SOA layer 301, third-party application platform 101 may be indirectly coupled thereto. For example, third-party application platform 101 may be disposed remotely with respect to any or all of SOA layer 301, feature mediation layer 21, application 11, application 12, SIP A/S platform 16, and subscriber database 103. Accordingly, SOA layer 301 may be coupled to third-party application platform 101 via a network connection, such as may comprise a LAN, a MAN, a WAN, IPSN 102, the Internet, a wireless network, etcetera. Similarly, any of SOA layer 301, feature mediation layer 21, application 11, application 12, SIP A/S platform 16, and subscriber database 103 may be disposed remotely with respect to any of the remaining components of system 20 and thus may be coupled thereto via a network connection, such as those mentioned above.

Each of service operations 302 through 305 may be a single available service or function. Any of service operations 302 through 305 may be a function of the same application, different applications, or different systems or may be standalone, custom designed services or functions. In the illustrated embodiment service operation 302 is a function of application 11, service operation 303 is a stand-alone service function, and service operations 304 and 305 are functions of application 12.

As but one example, application 11 may be a call routing application with multiple functions, including a calling card verification service operation as may be provided by service operation 302. Service operation 303 may be an audio conference service operation. In the prior art, the audio conference service (service operation 303) could not make use of the calling card authentication service operation (service operation 302 of application 11). In system 30, however, SOA layer 301 may combine service operation 302 of application 11 (in this example, a calling card authentication service operation) with service operation 303 (in this example, a audio conference service operation) into a single logical application. Similarly, one or more features of applications 12 and/or 111 (e.g., a voice mail service operation, a call recording service operation, etcetera) may be combined using SOA layer 301 and/or feature mediation layer 21. The foregoing combinations of features may be utilized according to embodiments of the invention to provide any number of logical applications to provide new and/or customized services.

A scripting mechanism employed according to embodiments of the present invention facilitates a script to be deployed with respect to multiple levels of a multi-level service orchestration system, such as in both feature mediation layer 21 and SOA layer 301 of FIG. 3, thereby simplifying the development and/or deployment of multi-level orchestration. The scripting mechanism of embodiments is similar to the system used in SOA (Service Oriented Architectures) to enable defining the interactions between services in a high level, descriptive text language. In the system of preferred embodiments, multiple independent services will exist or be created that operate autonomously. Examples of such services include voice mail, interactive voice response (IVR), announcement playout, conference control, external application platform control, etcetera. The scripting language is preferably used to define the interactions between these services which will create a logical application from the union of the services and the script. The scripting language of an embodiment is text based and provides a plurality of levels of functionality. For example, a first level of functionality provided by a scripting language may comprise a basic set of statements that allow script flow control, decision making, variable declarations, and linkage control to the services it will control. A second level of functionality provided by the foregoing scripting language may comprise a mechanism that allows the extension of the scripting language by making use of the interface methods of the services it is controlling. In other words, any method present on the interface of a service can be called from the scripting language without building explicit knowledge of the function into the base scripting language itself.

A first hierarchical script portion, for example, may be used by SOA layer 301 to group service operations 302 and 303 into a first service orchestrated application 31. A second script portion may be used by feature mediation layer 21 for inspecting the protocol interactions between the external devices and applications 11, 12, 31 and 111, thereby controlling the sequencing of access to applications based on the types of information and the types of control that are requested across the boundary. For example, by terminating service requests from user terminals or other devices of service network 102 at feature mediation layer 21 for operation of the applications and logical applications of system 30 to provide desired services, feature mediation layer 21 may provide sequencing of access to various shared service operations to facilitate optimal application operation (e.g., to avoid conflicts, to facilitate uninterrupted operation, to minimize delay, etcetera). Additionally or alternatively, feature mediation layer 21 may provide mediation between various protocols of the service operations to facilitate operation of logical applications.

As one of ordinary skill in the art will recognize in light of this disclosure, the first and second script portions described above may be written as a single script, e.g., a single set of commands to provide operation of service objects as a desired logical application, although portions of the script are deployed with respect to various layers of a multi-layer service orchestration system in order to facilitate appropriate interaction of different service operations and/or applications. The use of hierarchical scripts is disclosed more fully in the above referenced U.S. Patent Application entitled "SERVICE STRUCTURED APPLICATION DEVELOPMENT ARCHITECTURE."

Figure 4:
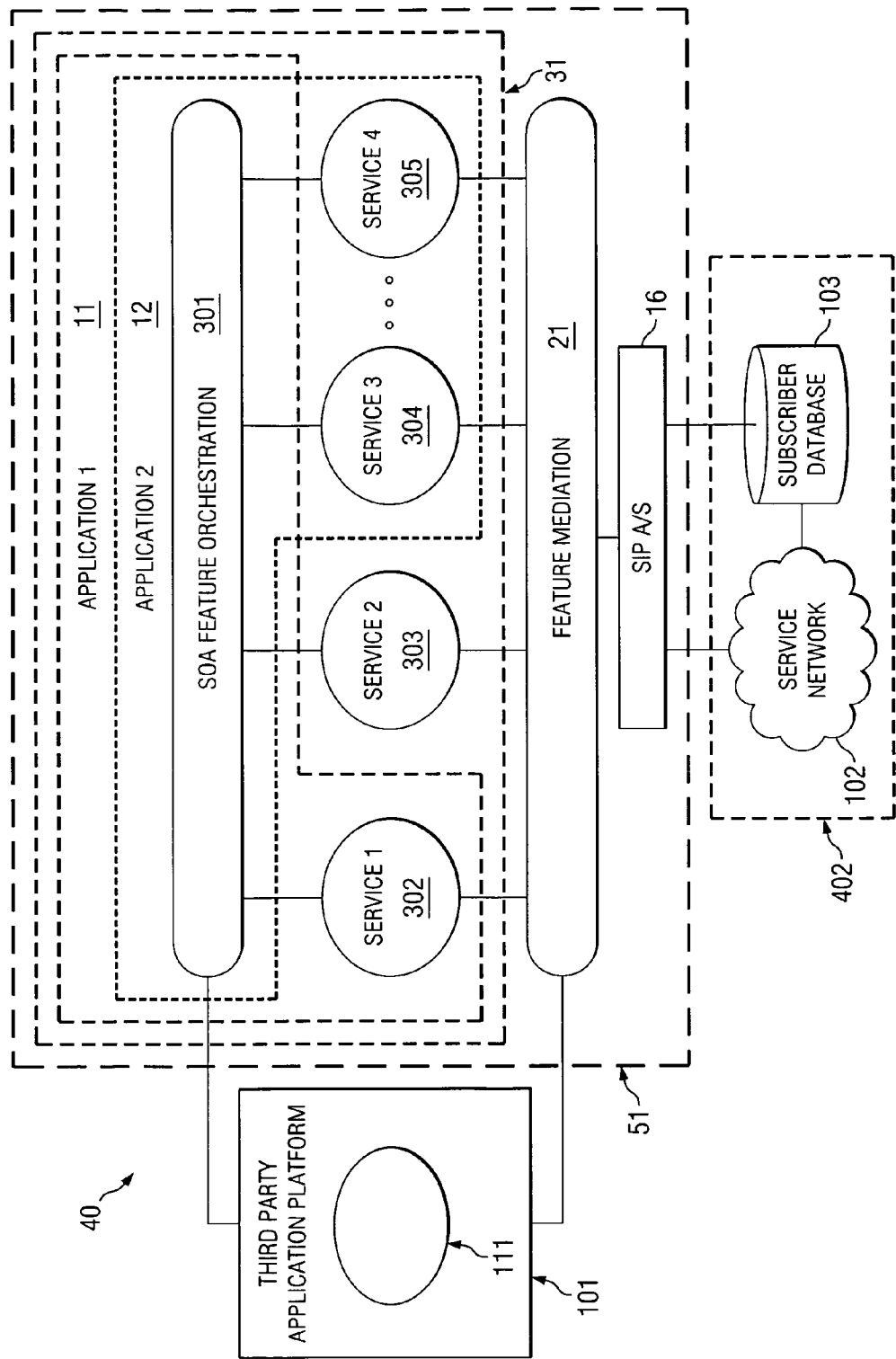
FIG. 4 shows a block diagram of a feature mediation and orchestration system with dynamic service coordination, according to an embodiment of the present invention.

FIG. 4 shows a block diagram of feature mediation and orchestration system 40, adapted to provide dynamic service coordination according to an exemplary embodiment of the present invention. System 40 of the illustrated embodiment provides a third level of orchestration by allowing service customization on a per subscriber basis. In this embodiment, subscriber database 103 has been adapted to hold an additional modifier within the subscriber's service profile for the scripted orchestration of logical applications, where the additional modifier contains a subscriber's level of service or other service coordination information. Hence, the additional modifier allows a service provider to uniquely specify services, e.g., the level of service, for each authenticated subscriber.

In operation according to one embodiment, once an authenticated subscriber is passed to SIP A/S platform 16 in order to access a service orchestrated application, such as any of applications 11, 12, 31 and 111, feature mediation layer 21 queries subscriber database 103 of dynamic service coordinator layer 402, retrieves the individual subscriber's service profile, and applies the subscriber's unique service qualifiers (e.g., level of service) to the script that has been defined for the overall coordinated application. Therefore, system 40 enables a service provider to modify the sequencing and operation of the application dynamically when a subscriber authenticates to the service.

Figure 5:
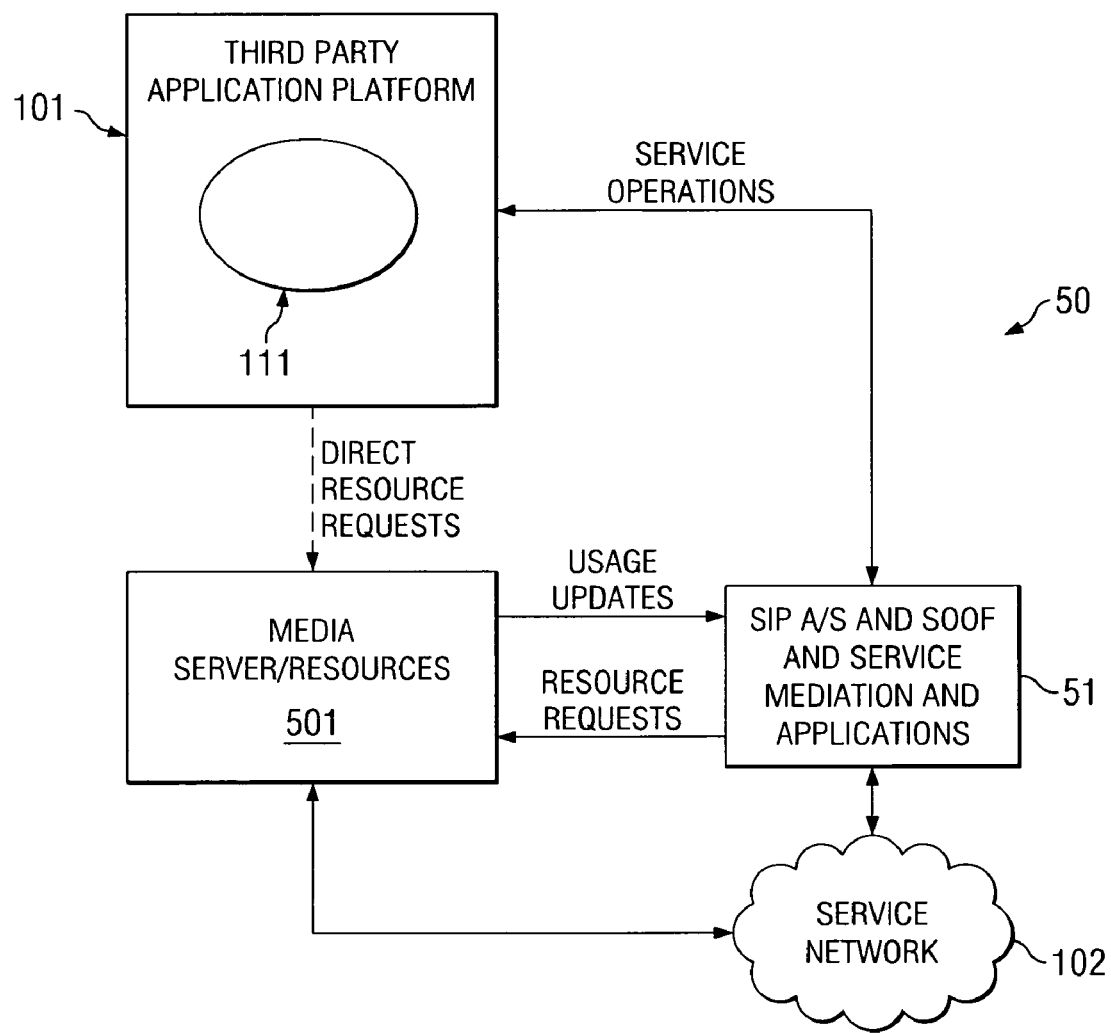
FIG. 5 shows a block diagram of a feature mediation and orchestration system intercepting resource usage for coordinating resource management or mediated platforms, according to an embodiment of the present invention.

FIG. 5 shows a block diagram of integrated feature mediation and orchestration system 50, according to an exemplary embodiment of the present invention. System 50 illustrates the integration of stand-alone, third-party application platform 101 and applications thereof with service orchestration subsystem 51 adapted according to an embodiment of the present invention. Service orchestration subsystem 51 illustrated in FIG. 5 represents SIP A/S platform 16, feature mediation layer 21, service objects 302 through 305, and SOA layer 301, as described above with reference to FIGS. 3 and 4. In the illustrated embodiment, third-party application platform 101 is coupled to subsystem 51 via IPSN 102. An adaptor object (not shown) may be provided with respect to service orchestration subsystem 51, e.g., created on SIP A/S platform 16, that understands the interface to third-party application platform 101 and/or application 111. Such an adaptor object may thus provide translation of service operations between third-party application platform 101 and/or application 111 and a feature mediation platform of service orchestration subsystem 51.

Some third-party applications are not written to request network resources and media resources through an application or feature mediation platform. In such cases, application 111 may directly access media resources server 501, which sends usage updates and resource requests to the SIP A/S' media application layer in subsystem 51. Therefore, the media application layer can further authenticate the use of the resource and track utilization of those media resources as they are being used by application 111.

It should be appreciated that, although embodiments have been described herein with reference to a SIP application server platform, the concepts of the present invention are not limited to use with respect to SIP based architectures or protocols. Embodiments of the present invention may be adapted for use with various IP service network architectures and protocols, such as service networks employing H.323 protocols.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method comprising:
providing a first telephony services application, where the first telephony services application comprises a stand-alone telephony services application;
providing a second telephony services application, where the second telephony services application comprises a custom telephony services application; and
combining, by a computer, a feature of the first telephony services application with a feature of the second telephony services application to form a logical telephony services application:
authenticating a subscriber;
providing the logical telephony services application to the subscriber;
wherein providing the logical telephony services application comprises selectively providing the logical telephony services application according to a level of service of the subscriber; and
managing the provisioning of the logical telephony services application to the subscriber.

2. The method of claim 1, where combining the feature of the first telephony services application with the feature of the second telephony services application comprises using a service orchestration application (SOA) script.

3. The method of claim 1, where managing the provisioning of the logical telephony services application to the subscriber comprises using a feature mediation script.

4. The method of claim 3, where the feature mediation script comprises the SOA script.

5. The method of claim 1 wherein each of said first telephony services application and said second telephony services application are compiled into a servlet and loaded on top of an application server platform.

6. A method comprising:
providing a service orchestration application for combining a feature of a first telephony services application with a feature of a second telephony services application to form a logical telephony services application, where the first telephony services application comprises a stand-alone telephony services application, and where the second telephony services application comprises a custom telephony services application;
providing, through operation of said service orchestration application operating on a computer, feature mediation with respect to at least one of the feature of the first telephony services application and the feature of the second telephony services application for providing a subscriber with a service of the logical telephone services application;
authenticating a subscriber;
providing the logical telephony services application to the subscriber;
wherein providing the logical telephony services application comprises selectively providing the logical telephony services application according to a level of service of the subscriber; and
managing the provisioning of the logical telephony services application to the subscriber.

7. The method of claim 6, further comprising providing feature mediation with respect to said at least one of the feature of the first telephony services application and the feature of the second telephony services application for providing another subscriber with a service of a respective one of said first telephony services application and said second telephony services application.

8. The method of claim 6, wherein said first telephony services application comprises a stand-alone application and said second telephony services application comprises a stand-alone application and said logical telephony services application provides a telephony service different than is provided by said first and second telephony services applications.

9. The method of claim 6, wherein said service orchestration application comprises a multi-layer application, said multi-layer application including at least two layers selected from the group consisting of a service mediation layer, a feature orchestration layer, and a dynamic service coordinator layer.

10. The method of claim 6 wherein each of said first telephony services application and said second telephony services application are compiled into a servlet and loaded on top of an application server platform.

11. A system comprising:
an application server platform; and
a feature mediation layer operable upon the application server platform, where the feature mediation layer provides a subscriber with a logical telephony services application comprising a feature of a first telephony services application and a feature of a second telephony services application where the first telephony services application comprises a stand-alone telephony services application, and where the second telephony services application comprises a custom telephony services application:
where the application server platform comprises a feature of authenticating a subscriber;
where the application server platform comprises a feature of providing the logical telephony services application to the subscriber;
wherein providing the logical telephony services application comprises selectively providing the logical telephony services application according to a level of service of the subscriber; and
where the application server platform manages the provisioning of the logical telephony services application to the subscriber.

12. The system of claim 11, where the logical telephony services application comprises a feature of a stand-alone telephony services application.

13. The system of claim 12, where the application server platform comprises a session initiation protocol (SIP) application.

14. The system of claim 11, further comprising a service orchestration application (SOA) operable upon the application server platform, where the SOA combines the feature of the first telephony services application with the feature of the second telephony services application to form the logical telephony services application.

15. The system of claim 11 wherein each of said first telephony services application and said second telephony services application are compiled into a servlet and loaded on top of an application server platform.

* * * * *